May 5, 1959     K. J. AVERSTEN     2,885,531

WELDING OR SOLDERING PIN WITH FUSE WIRE

Filed April 9, 1954

INVENTOR
KARL JOEL AVERSTEN,

BY Robert B Larson

ATTORNEY

United States Patent Office 2,885,531
Patented May 5, 1959

2,885,531

WELDING OR SOLDERING PIN WITH FUSE WIRE

Karl J. Averstein, Lidingo, Sweden, assignor to Svenska Aktiebolaget Gasaccumulator, Lidingo (near Stockholm), Sweden, a corporation of Sweden Application April 9, 1954, Serial No. 422,224

Claims priority, application Sweden April 11, 1953

7 Claims. (Cl. 219—99)

When fastening a metal pin, stud or the like to a surface by means of electric welding or soldering, a welding gun is generally used for keeping the pin in position during the fastening and for supplying welding current. The current supply takes place during a relatively short period and a timer is used for interrupting the current supply. This timer has previously been a separate, relatively cumbersome unit, connected to the gun by means of cables. According to my co-pending application Serial No. 258,239, filed November 26, 1951, for Electric Welding and Soldering Gun, now Patent No. 2,712,049, dated June 28, 1955, a simplified construction of the regulating part of the timer has, however, also been proposed, viz. to give it the form of a wire, which fuses as soon as the intended quantity of energy has passed the wire, and to apply this fuse wire in the gun. In order to facilitate the use of the fuse wire, it should be kept in a magazine in the gun and there must be feed arrangements for feeding the wire one piece at a time, as well as arrangements for throwing out fused wire pieces. Furthermore, the size of the fuse wire must be adapted to the cross section area of the pin to be fastened so that the fuse wire will have to be changed when using pins of another size of the cross section area than that of the pins used immediately before them.

The present invention has for its object completely to avoid these last mentioned operating devices for the fuse wire and the change of this wire. According to the invention, the pin is thus at its back end provided with a fuse wire, arranged as conductor for the supply of welding current to the pin, until the fuse wire fuses and interrupts the current supply.

The accompanying drawing shows, by way of example, some embodiments of the invention.

Figure 1:
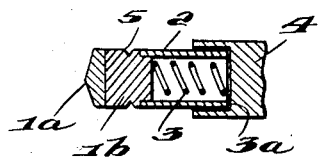
Fig. 1 shows a longitudinal section of a pin with fuse wire according to the invention.

In the embodiment illustrated in Fig. 1, the pin is a so-called soldering pin, consisting of a point 1a of a soldering metal, filled with flux, and of a main part 1b of, for instance, brass, copper or steel. Over the back end of the pin 1 is put a cylindrical sleeve 2 of electrically non-conducting material, such as plastic, glass, porcelain, cardboard, fibre or the like. At the back end of the pin, situated in the sleeve 2, is fastened a fuse wire 3 of, for instance, copper, aluminium, iron or the like, with a contact part 3a, reaching outside the end of the sleeve 2. The fuse wire is of such a size that it fuses as soon as a quantity of electrical energy, sufficient for melting the part 1a of the pin, has passed through the wire.

The described pin 1—3 is inserted into a partly shown chuck 4 of a welding or soldering gun and all the welding current is fed directly to the chuck 4 without being regulated by means of the earlier used time control devices. The current continues over the fuse wire 3a, 3 to the pin 1, between the end of which and the workpiece there is formed an arc, causing the end part 1a of the pin to fuse. When this has taken place to a sufficient degree, so much energy has passed through the fuse wire 3a, 3, that the wire fuses and interrupts further current supply. At the same moment, the chuck 4 drives the pin 1b, by means of the sleeve 2, against the workpiece and down into the melted metal, where the pin is effectively soldered after solidification. The sleeve 2 has thereby served as a power transmitting element and also as a protection casing against splashes from the arc. The sleeve 2 and the portion of the main part 1b, which is situated outside a groove 5, are removed.

Figure 2:
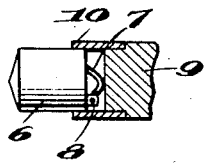
Fig. 2 shows a side view of a pin with another execution.

According to the embodiment illustrated in Fig. 2, a pin 6 is at its back end provided with a fuse wire 7, one end of which is fixed in the pin 6 and the other end of which is resting on an insulating support 8. A current conducting chuck 9 is suitably provided with an insulating ring 10 for catching the pin 6. This ring 10 could alternatively be placed on the pin. The support 8 functions so that it, together with the chuck 9, compulsively keeps the end of the fuse wire in contact position on the support and prevents the wire from turning aside, under influence of the heating, and interrupting the current supply, before the wire fuses.

Figure 3:
Fig. 3 shows a side view of a pin with yet another execution.

According to the embodiment illustrated in Fig. 3, a threaded welding stud 11 is at its back end provided with an electrically nonconducting tap 12, around which a fuse wire 13 is wound, one end of the fuse wire 13 thereby being fixed to the stud 11 and the other end of which being placed at the end surface of the tap 12 in order to be pressed against this surface and against a chuck for the above described purpose.

After the fuse wire has fused it will sometimes happen that the then free loops of the wire come into contact with each other with the result that the circuit is closed and a current supply takes place, which is neither intended nor wished. This can be avoided by an embodiment according to Figs. 4–7.

Figure 4:
Fig. 4 shows a side view of a welding pin with straight fuse wire according to the invention.
Figure 5:
Fig. 5 shows the welding pin of Fig. 4 seen from the right.

In the embodiments shown in Figs. 4 and 5, a welding pin 14 of, for instance, steel, is at its front end 15, which is intended to be welded to a metal object, suitably in the ordinary manner provided with a flux filling for facilitating the fusion of this front end. At the back end of the pin 14 a fuse wire 16 of copper, iron, aluminium or the like is fixed, suitably by means of welding. The fuse wire 16 is entirely or essentially straight and lies freely protruding in the axial direction of the pin 14. The size of the wire 16 is so adapted that the wire fuses as soon as a quantity of electrical energy sufficient for melting the front part 15 of the pin has passed through the wire. The size must, however, at the same time be sufficient for the wire 16 to get the necessary firmness and to be able to protrude freely horizontally without bending downwards. If the wire 16 of a certain metal should, with regard to the limited supply of energy to be effected by it, have to be so weak that the above mentioned claim to firmness of the wire is not fulfilled, a metal of inferior electric conductivity must be chosen for the wire, whereby an increased size of the wire will be necessary.

Figure 6:
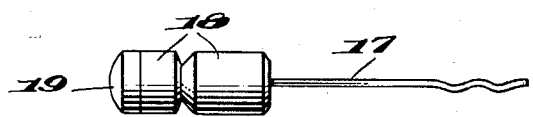
Figs. 6 and 7 show side views of different soldering pins with further modified, straight fuse wires according to the invention.

In the embodiment shown in Fig. 6, the fuse wire 17 is fixed in a metal pin 18, for instance of steel, brass or copper, the front end 19 of which consists of a soldering metal, suitably with a flux filled outer end. The part of the wire 17 which is next to the pin 18, is straight, but its outer end is waved or corrugated for some part in order to give good contact with a current supply device by means of its own tension.

Figure 7:
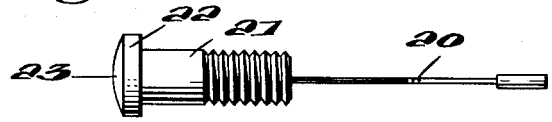

In the embodiment shown in Fig. 7, the straight fuse wire 20 is fixed in a threaded metal stud 21, the front end 22 of which forms a head, supporting at its outer side a suitably flux filled soldering metal 23. The outer end of the fuse wire 20 is thereby thickened in order to give good contact with a current supply device.

The form of the fuse wire as well as its connection to the pin may of course be varied and it may also be used with different kinds of welding or soldering pins. The fuse wire may be slightly waved along its whole length or entirely or partly run along a screw line and its firmness may be improved by means of some stiffening material, possibly fastened to only a part of the fuse wire. The straight fuse wire need not be placed centrally at the back end of the pin, but may be situated for instance at the edge of this end. The fuse wire may be placed in a channel in a relatively thin, separate disk and have its ends projecting as contacts, the disk thus being placed at the back end of the pin to be fastened. The pin or stud or whichever object the fuse wire is fixed in, may have a form of execution which is quite independent of the execution of the fuse wire.

What is claimed is:

1. A pin for connection to a metallic surface by means of an electric arc apparatus comprising a main metal part, one end of said part adapted for connection to the metallic surface, the other end of said part having a fusible wire thereon, said fusible wire providing an electrical connection between the main metal part and the electric arc apparatus, the fusible wire being adapted to fuse and interrupt the current supply after a predetermined time delay.

2. A pin according to claim 1 including an insulating sleeve extending around said fusible wire.

3. A pin according to claim 1 including an insulating tap secured to said other end of the main metal part, the fusible wire being wound around the tap.

4. A pin according to claim 1, the fusible wire having a corrugation in the free end thereof to insure electrical conduction to the wire.

5. A pin according to claim 1, the fusible wire having an enlarged portion on the free end thereof.

6. A pin according to claim 1, the free end of the fusible wire being supported on an insulating block on said main metal part.

7. A soldering pin comprising a main metal part, solder disposed on one end of said main metal part, the solder having a melting point lower than that of the main metal part, a fusible wire on the other end of the main metal part, the fusible wire constituting a conductor for the supply of current to the soldering pin, the fusible wire fusing and interrupting the current supply in a predetermined time interval.

References Cited in the file of this patent

UNITED STATES PATENTS

| | | |
|---|---|---|
| 412,599 | Coffin | Oct. 8, 1889 |
| 710,056 | Haskins | Sept. 30, 1902 |
| 1,608,825 | Wagner | Nov. 30, 1926 |
| 2,419,149 | Ludwig | Apr. 15, 1947 |
| 2,584,491 | Nelson | Feb. 5, 1952 |